(12) United States Patent
Honjo et al.

(10) Patent No.: US 10,801,919 B2
(45) Date of Patent: Oct. 13, 2020

(54) FAULT DETECTION SENSOR-EQUIPPED ACTUATOR AND METHOD FOR DETECTING FAULT IN ACTUATOR

(71) Applicant: THK CO., LTD., Tokyo (JP)

(72) Inventors: Yoshiyuki Honjo, Tokyo (JP); Shuhei Yamanaka, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/323,330

(22) PCT Filed: Jun. 26, 2017

(86) PCT No.: PCT/JP2017/023333
§ 371 (c)(1),
(2) Date: Feb. 5, 2019

(87) PCT Pub. No.: WO2018/047439
PCT Pub. Date: Mar. 15, 2018

(65) Prior Publication Data
US 2019/0346341 A1 Nov. 14, 2019

(30) Foreign Application Priority Data
Sep. 9, 2016 (JP) .................. 2016-176926

(51) Int. Cl.
*G01M 13/00* (2019.01)
*G01H 17/00* (2006.01)
(Continued)

(52) U.S. Cl.
CPC ............ *G01M 13/00* (2013.01); *G01H 1/003* (2013.01); *G01H 17/00* (2013.01);
(Continued)

(58) Field of Classification Search
CPC .. G01M 13/00; G01M 13/045; G01M 13/028; G01H 17/00; G01H 1/003
(Continued)

(56) References Cited

U.S. PATENT DOCUMENTS

| 6,240,796 B1 * | 6/2001 | Yamada ............... B23Q 1/0063 |
| | | 74/89.23 |
| 6,853,951 B2 * | 2/2005 | Jarrell ................ G05B 23/0283 |
| | | 702/181 |

(Continued)

FOREIGN PATENT DOCUMENTS

| CN | 1688874 A | 10/2005 |
| CN | 201168877 Y | 12/2008 |

(Continued)

OTHER PUBLICATIONS

International Search Report dated Sep. 12, 2017, issued in counterpart application No. PCT/JP2017/023333 (2 pages).
(Continued)

*Primary Examiner* — Stephanie E Bloss
(74) *Attorney, Agent, or Firm* — Westerman, Hattori, Daniels & Adrian, LLP (57) ABSTRACT

A fault detection sensor-equipped actuator is provided which can easily detect a fault in at least one of a linear guide unit and a ball screw unit, using a shared sensor. In an actuator (10) including a linear guide unit (4) that guides linear movement of a movable body (1) and a ball screw unit (7) that drives the movable body (1) in an axial direction of a screw shaft (6), a sensor (18) configured to detect a fault in the actuator (10) is placed in a housing (11) where a coupling (12) that couples the screw shaft (6) and a motor (14) for rotating the screw shaft (6) is housed.

2 Claims, 4 Drawing Sheets

(51) Int. Cl.
   *G01M 13/045* (2019.01)
   *G01M 13/028* (2019.01)
   *G01H 1/00* (2006.01)
   *G01M 15/12* (2006.01)

(52) U.S. Cl.
   CPC ........ *G01M 13/028* (2013.01); *G01M 13/045* (2013.01); *G01M 15/12* (2013.01)

(58) Field of Classification Search
   USPC .......................................................... 702/183
   See application file for complete search history.

(56) References Cited

U.S. PATENT DOCUMENTS

| | | | |
|---|---|---|---|
| 7,184,930 B2* | 2/2007 | Miyasaka | B61F 15/20 246/169 A |
| 8,370,109 B2* | 2/2013 | Van Dyke | G01M 13/028 702/184 |
| 2013/0282335 A1* | 10/2013 | Hudson | G01M 13/045 702/183 |
| 2014/0039666 A1* | 2/2014 | Kim | G05B 19/404 700/174 |
| 2015/0047444 A1 | 2/2015 | Tsai et al. | |
| 2016/0077161 A1* | 3/2016 | Balogh | G01N 33/0009 324/764.01 |

FOREIGN PATENT DOCUMENTS

| | | |
|---|---|---|
| CN | 104373540 A | 2/2015 |
| DE | 20 2007 009 743 U1 | 11/2008 |
| JP | 11-30234 A | 2/1999 |
| JP | 2010-96541 A | 4/2010 |
| JP | 2011-107030 A | 6/2011 |
| JP | 2013-257253 A | 12/2013 |

OTHER PUBLICATIONS

Decision to Grant a Patent dated Jan. 9, 2018, issued in counterpart Japanese Patent Application No. 2016-176926, w/English translation (6 pages).
Office Action dated Aug. 19, 2019, issued in counterpart CN Application No. 201780054738.8, with English translation (8 pages).
Search Report dated Aug. 9, 2019, issued in counterpart CN Application No. 201780054738.8, with English translation (2 pages).

* cited by examiner

FAULT DETECTION SENSOR-EQUIPPED ACTUATOR AND METHOD FOR DETECTING FAULT IN ACTUATOR

TECHNICAL FIELD

The present invention relates to a fault detection sensor-equipped actuator and a method for detecting a fault in an actuator.

BACKGROUND ART

An actuator being a combination of a linear guide unit and a ball screw unit, in other words, an actuator that causes the linear guide unit to guide linear movement of a movable body and causes the ball screw unit to drive the movable body in an axial direction of a screw shaft, is known.

The linear guide unit guides linear movement of the movable body by using rolling motion of a plurality of rolling elements such as balls and rollers. The ball screw unit includes a plurality of balls between the screw shaft and a nut in such a manner as to be capable of rolling motion, and rotates the screw shaft to drive the nut in the axial direction of the screw shaft.

When the actuator is used for a long term, flaking, that is, a phenomenon where part of a rolling element and a rolling element rolling surface of at least one of the linear guide unit and the ball screw unit peels away in flakes, occurs on the rolling element and the rolling element rolling surface. Such a fault, for example, flaking, prevents smooth movement of the movable body. Hence, it is requested to diagnose a fault in at least one of the linear guide unit and the ball screw unit.

Patent Literature 1 discloses a fault diagnosis apparatus that has a vibration sensor attached to a linear guide unit to process a signal detected by the vibration sensor in a signal processing unit, as a fault diagnosis apparatus of the linear guide unit. A judgement is made on whether or not the strength of the signal processed by the signal processing unit has exceeded a predetermined threshold; accordingly, it is possible to judge whether or not the linear guide unit has become defective.

CITATION LIST

Patent Literature

Patent Literature 1: JP 2010-96541 A

SUMMARY OF INVENTION

Technical Problem

Upon diagnosing a fault in an actuator, it is conceivable that a sensor for detecting a fault is attached to each of a linear guide unit and a ball screw unit. However, attaching the sensor to each of the linear guide unit and the ball screw unit results in an increase in the number of sensors and creating a need to route wires for sensors. On the other hand, when the actuator is replaced, not only the linear guide unit or the ball screw unit but the entire actuator is replaced in many cases. It can be said that it is not necessarily required to individually diagnose the linear guide unit and the ball screw unit.

Hence, it is conceivable that a shared sensor detects a fault in at least one of the linear guide unit and the ball screw unit. However, if the shared sensor detects a fault in at least one of the linear guide unit and the ball screw unit, there arises a problem that it is easy to detect a fault in the ball screw unit but it is difficult to detect a fault in the linear guide unit. This is because the magnitude of vibration (vibration, an elastic wave, or ultrasound) that occurs on the ball screw unit is greater than the magnitude of vibration that occurs on the linear guide unit. The ball screw unit is used to drive a movable body. Torque from a motor acts on the ball screw unit. Accordingly, the vibration that occurs on the ball screw unit is greater.

Hence, an object of the present invention is to provide a fault detection sensor-equipped actuator and a method for detecting a fault in an actuator that can easily detect a fault in at least one of a linear guide unit and a ball screw unit, using a shared sensor.

Solution to Problem

In order to solve the above problem, one aspect of the present invention is a fault detection sensor-equipped actuator including an actuator and a signal processing unit, the actuator having a linear guide unit that guides linear movement of a movable body, and a ball screw unit that drives the movable body in an axial direction of a screw shaft, the actuator including: a sensor configured to detect a fault in the actuator, inside a housing where a coupling that is directly coupled on the screw shaft and a motor shaft of a motor for rotating the screw shaft is housed, in which boundaries of the housing are outlined by frame-shaped wall portions and a bottom portion to which the frame-shaped wall portions are fixed, the frame-shaped wall portions including a first wall portion provided with a bearing configured to rotatably support one end portion in an axial direction of the screw shaft closer to the motor than the other end portion in the axial direction of the screw shaft is, a second wall portion to which a main body of the motor is directly attached by a fastening member, a third wall portion and a fourth wall portion that face each other and are directly connected to the first wall portion and the second wall portion, the sensor is placed on a top surface of the bottom portion of the housing and under the coupling, and the sensor includes a vibration sensor that detects vibration of the housing, an AE (Acoustic Emission) sensor that detects an elastic wave propagating to the housing, or an ultrasonic sensor that detects ultrasound propagating to the housing.

Another aspect of the present invention is a method for detecting a fault in an actuator having a linear guide unit that guides linear movement of a movable body, and a ball screw unit that drives the movable body in an axial direction of a screw shaft, the method including placing a sensor configured to detect a fault in the actuator, inside a housing where a coupling that is directly coupled on the screw shaft and a motor shaft of a motor for rotating the screw shaft is housed, in which boundaries of the housing are outlined by frame-shaped wall portions and a bottom portion to which the frame-shaped wall portions are fixed, the frame-shaped wall portions including a first wall portion provided with a bearing configured to rotatably support one end portion in an axial direction of the screw shaft closer to the motor than the other end portion in the axial direction of the screw shaft is, a second wall portion to which a main body of the motor is directly attached by a fastening member, a third wall portion and a fourth wall portion that face each other and are directly connected to the first wall portion and the second wall portion, the sensor is placed on a top surface of the bottom portion of the housing and under the coupling, the sensor includes a vibration sensor that detects vibration of the housing, an AE (Acoustic Emission) sensor that detects an elastic wave propagating to the housing, or an ultrasonic sensor that detects ultrasound propagating to the housing.

Advantageous Effects of Invention

According to the present invention vibration (vibration, an elastic wave, or ultrasound) that occurs on a ball screw unit resulting from a fault is attenuated by a bearing of a housing and propagates to the housing. On the other hand, vibration that occurs on a linear guide unit resulting from a fault is not attenuated to the same degree as the ball screw unit and propagates to the housing. The magnitude of the vibration that propagates from the ball screw unit to the housing approaches the magnitude of the vibration that propagates from the linear guide unit to the housing; accordingly, a shared sensor can easily detect a fault in at least one of the linear guide unit and the ball screw unit.

BRIEF DESCRIPTION OF DRAWINGS

FIG. 3 is a detailed diagram of the actuator of the embodiment from which the motor has been removed (FIG. 3A is a plan view, FIG. 3B is a side view, FIG. 3C is a cross-sectional view along line c-c of FIG. 3A, and FIG. 3D is a front view).

DESCRIPTION OF EMBODIMENTS

Figure 1:
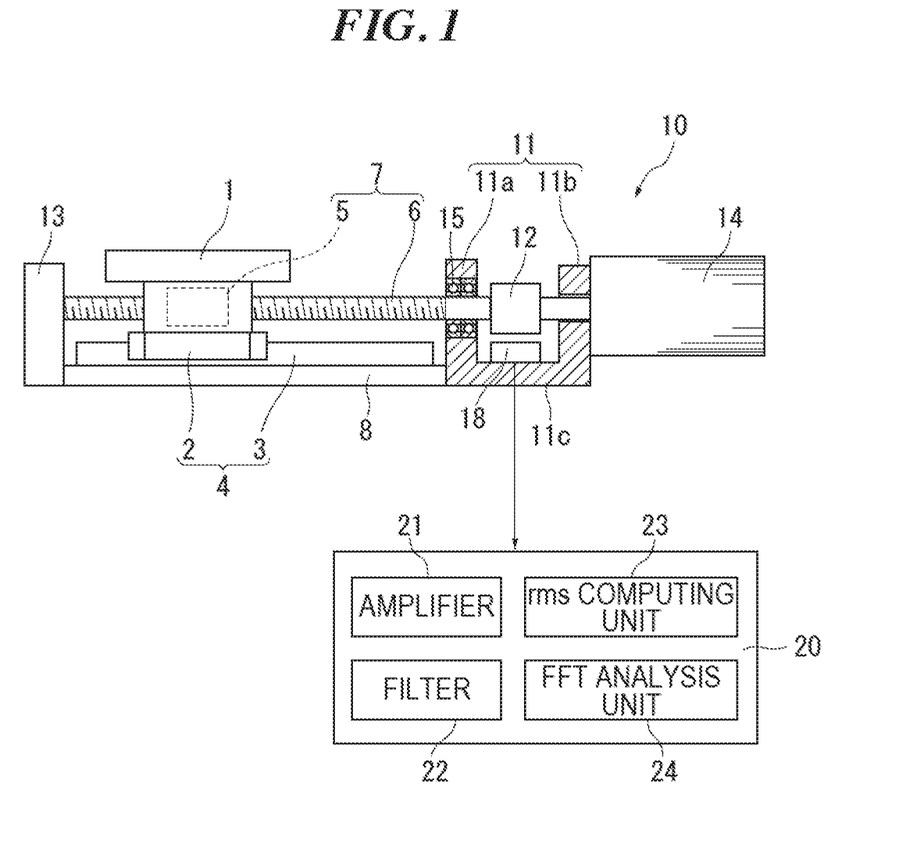
FIG. 1 is a schematic side view of a fault detection sensor-equipped actuator of a first embodiment of the present invention.
Figure 2:
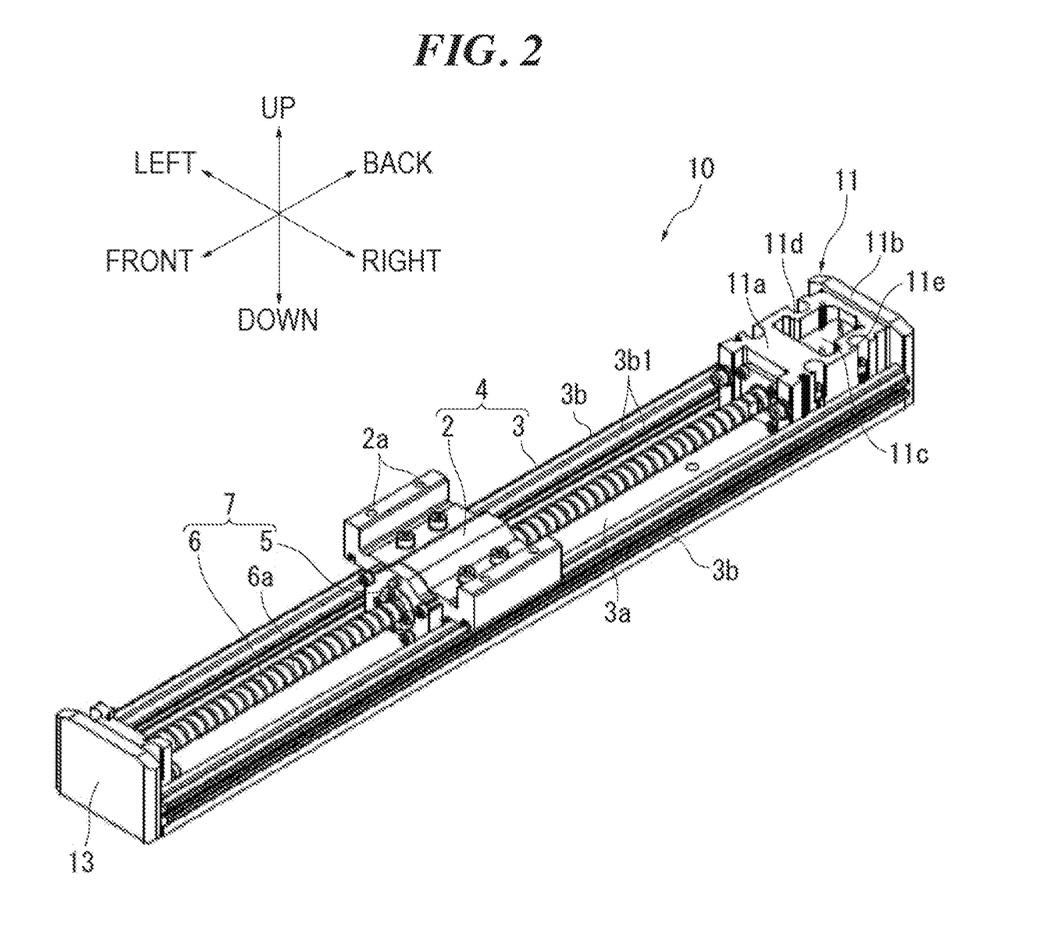
FIG. 2 is a perspective view of the actuator of the embodiment from which a motor has been removed.
Figure 3A:
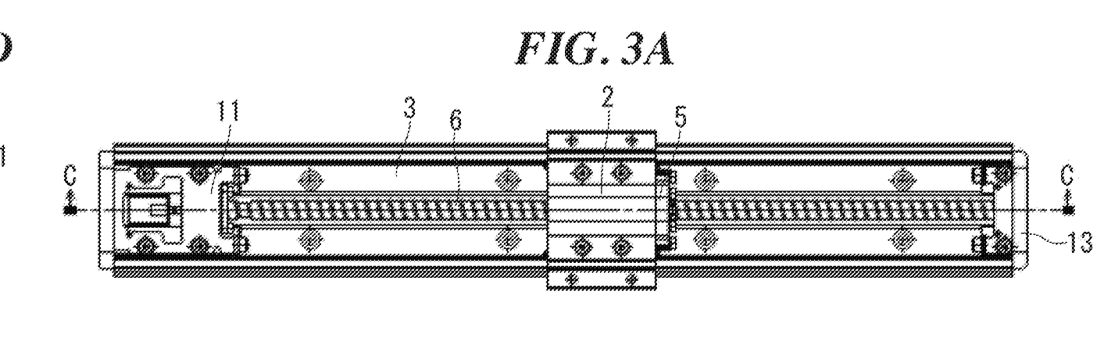
Figure 3B:
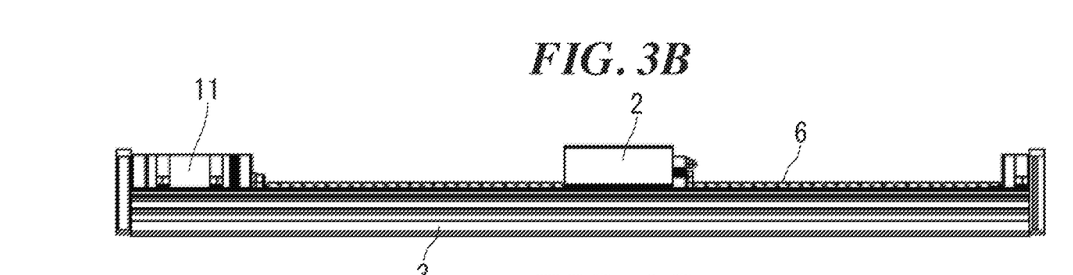
Figure 3C:
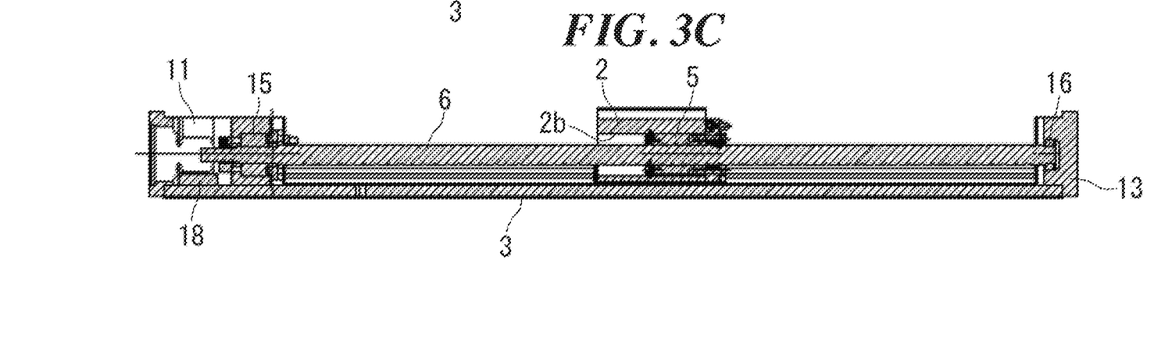
Figure 3D:
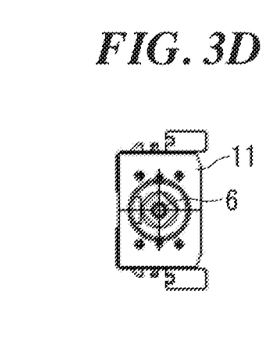

A fault detection sensor-equipped actuator and a method for detecting a fault in an actuator of embodiments of the present invention are described in detail hereinafter with reference to the accompanying drawings. However, the fault detection sensor-equipped actuator and the method for detecting a fault in an actuator of the present invention can be embodied in various modes, and are not limited to the embodiments described in the description. The embodiments are provided with the intention of encouraging those skilled in the art to fully understand the scope of the invention by fully disclosing the description.
(Fault Detection Sensor-Equipped Actuator of First Embodiment of the Present Invention)
FIG. 1 is a schematic side view of a fault detection sensor-equipped actuator 10 of a first embodiment of the present invention. The actuator 10 of the embodiment includes a linear guide unit 4 that guides linear movement of a block 1 as a movable body, and a ball screw unit 7 that drives the block 1 as the movable body in an axial direction of a screw shaft 6.
The linear guide unit 4 includes a track rail 3, and a moving block 2 that is assembled to the track rail 3 via a plurality of rolling elements such as balls or rollers in such a manner as to be movable in a length direction. The track rail 3 is attached to a base 8. The moving block 2 is attached to the block 1. It is also possible to integrate the track rail 3 of the linear guide unit 4 with the base 8 and integrate the moving block 2 with the block 1 as the movable body.
The ball screw unit 7 includes the screw shaft 6, and a nut 5 that is threadedly engaged with the screw shaft 6 via a plurality of balls. The plurality of balls is placed between a ball rolling groove of the screw shaft 6 and a ball rolling groove of the nut 5. The nut 5 is attached to the block 1 as the movable body. One end portion in the axial direction of the screw shaft 6 is rotatably supported by a housing 11. The housing 11 is fixed to the base 8 or the track rail 3. The other end portion in the axial direction of the screw shaft 6 is rotatably supported by an end portion wall 13. The end portion wall 13 is fixed to the base 8 or the track rail 3.
The screw shaft 6 is rotated and driven by a motor 14. The motor 14 is attached to the housing 11. The screw shaft 6 and the motor 14 are coupled by a coupling 12. The coupling 12 is housed in the housing 11.
When the motor 14 rotates and drives the screw shaft 6, the nut 5 that is threadedly engaged with the screw shaft 6 moves in the axial direction of the screw shaft 6. The nut 5 is attached to the block 1 to move the block 1 together with the nut 5 in the axial direction of the screw shaft 6.
FIGS. 2 and 3 illustrate detailed diagrams of the actuator 10 from which the motor 14 has been removed. FIG. 2 illustrates a perspective view. FIG. 3A illustrates a plan view, FIG. 3B a side view, FIG. 3C a cross-sectional view, and FIG. 3D a front view. FIGS. 2 and 3 illustrate the actuator 10 where the track rail 3 of the linear guide unit 4 is integrated with the base 8 (refer to FIG. 1), and the moving block 2 is integrated with the block 1 (refer to FIG. 1) as the movable body. In the following description, the configuration of the actuator 10 is described using directions when viewed in the axial direction of the screw shaft 6 in a state where the actuator 10 is placed on a horizontal plane, that is, up and down, left and right, and front and back directions illustrated in FIG. 2, for convenience of description. Naturally, the placement of the actuator 10 is not limited to this.
The track rail 3 of the linear guide unit 4 has a U shape in cross section and extends long and narrow in the front-and-back direction. The track rail 3 includes a bottom wall portion 3a and a pair of side wall portions 3b facing each other. A ball rolling portion 3b1 is formed in a longitudinal direction on an inner side surface of each side wall portion 3b. In the embodiment, two ball rolling portions 3b1 are formed in an upper part and a lower part of each side wall portion 3b.
The moving block 2 of the linear guide unit 4 is sandwiched between the pair of side wall portions 3b of the track rail 3, and is assembled to the track rail 3 via the rolling elements in such a manner as to be movable in the length direction. A screw hole 2a for attachment to a counterpart component is formed on a top surface of the moving block 2. The moving block 2 includes a track-shaped circulation path. The track-shaped circulation path includes a ball rolling portion facing the ball rolling portion 3b1 of the track rail 3, a return path parallel to the ball rolling portion, and a pair of U-shaped turn-around paths that connect one end of the ball rolling portion and one end of the return path. A plurality of balls as the rolling elements is arranged in the circulation path.
When the moving block 2 moves linearly with respect to the track rail 3, the plurality of balls performs rolling motion between the ball rolling portion of the track rail 3 and the ball rolling portion of the moving block 2, and circulates along the circulation path. The rolling motion of the balls is used to enable the moving block 2 to move without play between the track rail 3 and the moving block 2.
One end portion of the screw shaft 6 of the ball screw unit 7 is rotatably supported by the housing 11, and the other end portion is rotatably supported by the end portion wall 13. A helical ball rolling grove 6a is formed on an outer peripheral surface of the screw shaft 6. A bearing 15 (refer to FIG. 3C)

that rotatably supports the one end portion of the screw shaft 6 is provided to the housing 11. A bearing 16 (refer to FIG. 3C) that rotatably supports the other end portion of the screw shaft 6 is provided to the end portion wall 13.

The screw shaft 6 penetrates the moving block 2. Amounting hole 2b (refer to FIG. 3C) into which the nut 5 is inserted is formed in the moving block 2. The nut 5 is attached in the mounting hole 2b of the moving block 2. A helical ball rolling groove facing the ball rolling groove 6a of the screw shaft 6 is formed on an inner peripheral surface of the nut 5. A circulation component such as a return pipe that connects one end and the other end of the helical ball rolling groove of the nut 5 is provided to the nut 5. The helical ball rolling groove and circulation component of the nut 5 configure a circulation path of the ball screw unit 7. The plurality of balls is arranged in the circulation path.

When the screw shaft 6 rotates, the nut 5 moves in the axial direction. When the screw shaft 6 rotates, the plurality of balls performs rolling motion between the screw shaft 6 and the nut 5 and circulates along the circulation path. The rolling motion of the balls is used to enable the nut 5 to move in the axial direction without play between the screw shaft 6 and the nut 5.

As illustrated in FIG. 2, the housing 11 is fixed to the track rail 3 of the linear guide unit 4 by a fastening member such as a bolt. The housing 11 includes a bottom portion 11c integrated with the track rail 3, and frame-shaped wall portions 11a, 11b, 11d, and 11e that stand on the bottom portion 11c. The wall portions 11a, 11b, 11d, and 11e include a first wall portion 11a provided with the bearing 15, a second wall portion 11b to which the motor 14 is attached by a fastening member such as a bolt, the second wall portion 11b facing the first wall portion 11a, and a third wall portion 11d and a fourth wall portion 11e that face each other and are orthogonal to the first wall portion 11a and the second wall portion 11b. The coupling 12 (refer to FIG. 1) that couples the screw shaft 6 and the motor 14 is housed in the housing 11.

As illustrated in FIG. 1, a sensor 18 for detecting a fault in the actuator 10 is placed inside the housing 11. The sensor 18 is placed on a top surface of the bottom portion 11c of the housing 11. The sensor 18 is a vibration sensor that detects the vibration of the housing 11, an AE (Acoustic Emission) sensor that detects an elastic wave propagating to the housing 11, or an ultrasonic sensor that detects ultrasound propagating to the housing 11. In the embodiment, the sensor 18 is a vibration sensor that detects the vibration of the surface of the housing 11, specifically an acceleration sensor that detects the acceleration of the surface of the housing 11.

A fault diagnosis system of the actuator of the embodiment includes the actuator 10 and a signal processing unit 20. A signal detected by the sensor 18 is inputted into the signal processing unit 20 configured by, for example, a measurement device. The signal processing unit 20 includes an amplifier 21 that amplifies the signal detected by the sensor 18, a filter 22 that extracts a predetermined range of frequencies from the amplified signal, an rms computing unit 23 that calculate rms (Root Mean Square) intensity from the filtered signal, and an FFT analysis unit 24 that performs FFT (Fast Fourier Transformation) analysis on the signal detected by the sensor 18 and/or the filtered signal.

The filter 22 extracts a resonance frequency band of the housing 11 from the signal detected by the sensor 18 (including the signal amplified by the amplifier 21). When a fault such as flaking occurs in at least one of the linear guide unit 4 and the ball screw unit 7, that is, the linear guide unit 4 and/or the ball screw unit 7, the linear guide unit 4 and/or the ball screw unit 7 vibrate even at a frequency different from a frequency under normal conditions, due to the fault. The vibration of the linear guide unit 4 and/or the ball screw unit 7 resulting from the fault propagates to the housing 11, and produces resonance in the housing 11. The vibration of the resonance frequency band of the housing 11 is extracted to compare the rms intensity with one under normal conditions. Accordingly, it is possible to find whether or not a fault has occurred in the linear guide unit 4 and/or the ball screw unit 7.

It is also possible to extract a frequency band of the vibration of the ball screw unit 7 resulting from a fault through the filter 22 and extract a frequency band of the vibration of the linear guide unit 4 resulting from a fault through the filter 22 instead of extracting the vibration of the resonance frequency band of the housing 11 through the filter 22. They are extracted to compare the rms intensity with one under normal conditions; accordingly, it is possible to find whether or not a fault has occurred in the linear guide unit 4 and/or the ball screw unit 7.

The rms computing unit 23 calculates the root mean square (rms) of a filtered signal from, for example, the following expression.

$$\text{rms} = \frac{\sqrt{\sum_{i=1}^{n} x_i^2}}{n} = \sqrt{\frac{x_1^2 + x_2^2 + x_3^2 + \ldots + x_n^2}{n}}$$ [Math. 1]

where n is the number of pieces of data captured, x is a physical quantity (amplitude) corresponding to each data point, and i=1 to n.

It is determined whether or not the rms intensity exceeds a predetermined threshold. Accordingly, it is possible to find whether or not a fault has occurred in the linear guide unit 4 and/or the ball screw unit 7. It is also possible to use a root mean square envelope (Envelopment rms) instead of the root mean square.

The FFT analysis unit 24 performs FFT analysis on the signal detected by the sensor 18 to analyze the frequency of the vibration of the housing 11. On the basis of the FFT analysis, it is possible to find whether vibration resulting from a fault in the ball screw unit 7, or vibration resulting from a fault in the linear guide unit 4, has propagated to the housing 11. STFT (Short-time Fourier Transform, Short-term Fourier Transform) analysis, a wavelet transform (wavelet transformation), and the like can also be performed instead of or together with FFT analysis.

The above single processing unit 20 enables, for example, the following determination.

(1) In the event of a fault in the linear guide unit 4
 (a) It is determined from the rms intensity of the vibration of the housing 11 that at least one of the linear guide unit 4 and the ball screw unit 7 has become defective although it is unknown which of the linear guide unit 4 and the ball screw unit 7 or both have become defective.
 (b) It is determined from the rms intensity of the vibration of the housing 11 that the linear guide unit 4 has become defective and the ball screw unit 7 has not become defective.
 (c) It is determined from the rms intensity and FFT analysis of the vibration of the housing 11 that the linear guide unit 4 has become defective and the ball screw unit 7 has not become defective.

(2) In the event of a fault in the ball screw unit 7

(a) It is determined from the rms intensity of the vibration of the housing 11 that at least one of the linear guide unit 4 and the ball screw unit 7 has become defective although it is unknown which of the linear guide unit 4 and the ball screw unit 7 or both have become defective.

(b) It is determined from the rms intensity of the vibration of the housing 11 that the ball screw unit 7 has become defective and the linear guide unit 4 has not become defective.

(c) It is determined from the rms intensity and FFT analysis of the vibration of the housing 11 that the ball screw unit 7 has become defective and the linear guide unit 4 has not become defective.

(3) In the event of faults in both of the linear guide unit 4 and the ball screw unit 7

(a) It is determined from the rms intensity of the vibration of the housing 11 that at least one of the linear guide unit 4 and the ball screw unit 7 has become defective although it is unknown which of the linear guide unit 4 and the ball screw unit 7 or both have become defective.

(b) It is determined from the rms intensity of the vibration of the housing 11 that both of the linear guide unit 4 and the ball screw unit 7 have become defective.

(c) It is determined from the rms intensity and FFT analysis of the vibration of the housing 11 that both of the linear guide unit 4 and the ball screw unit 7 have become defective.

Up to this point, the fault detection sensor-equipped actuator 10 of the first embodiment of the present invention has been described. According to the embodiment, the following effects are exerted.

Vibration that occurs on the ball screw unit 7 resulting from a fault is attenuated by the bearing and propagates to the housing 11. On the other hand, vibration that occurs on the linear guide unit 4 resulting from a fault is not attenuated to the same degree as the ball screw unit 7 and propagates to the housing 11. The magnitude of the vibration propagating from the ball screw unit 7 to the housing 11 approaches the magnitude of the vibration propagating from the linear guide unit 4 to the housing 11. Accordingly, the shared sensor 18 can easily detect a fault in at least one of the linear guide unit 4 and the ball screw unit 7.

Moreover, the sensor 18 is placed in the housing 11. Accordingly, the sensor 18 does not hinder the stroke of the moving block 2 of the linear guide unit 4, and can also detect a fault in a bearing inside the motor 14 and a fault in the bearing of the housing 11 in some cases. Furthermore, the sensor 18 is placed on not the moving side such as the moving block 2 or the nut 5 but the fixed side; accordingly, the routing of wires is also unnecessary.

The sensor 18 is placed on the top surface of the bottom portion 11c of the housing 11. Accordingly, in addition to that the above effects are exerted, a dead space below the coupling 12 can be made effective use.

The filter 22 extracts the vibration of the resonance frequency band of the housing 11. Accordingly, it is possible to detect the resonance of the housing 11 caused by vibration resulting from a fault in the linear guide unit 4 and/or the ball screw unit 7 propagating to the housing 11. The resonance frequency of the track rail 3 of the linear guide unit 4 changes depending on the position of the moving block 2. However, the resonance frequency of the housing 11 is not affected by the position of the moving block 2. The vibration of the resonance frequency band of the housing 11 is extracted to enable the detection of a fault in at least one of the linear guide unit 4 and the ball screw unit 7.

(Fault Detection Sensor-Equipped Actuator of Second Embodiment of the Present Invention)

Figure 4:
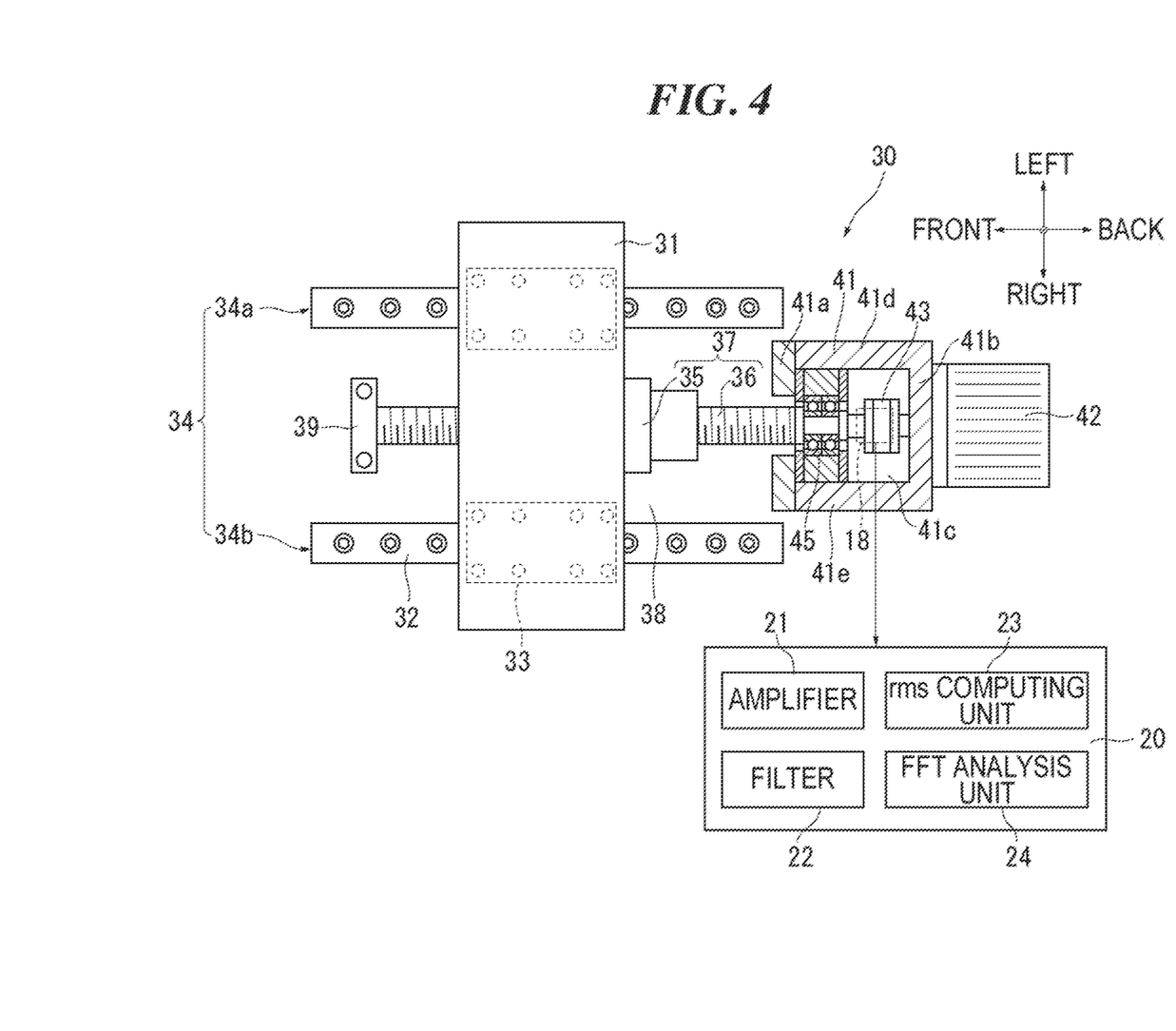
FIG. 4 is a schematic plan view of a fault detection sensor-equipped actuator of a second embodiment of the present invention.

FIG. 4 is a schematic plan view of a fault detection sensor-equipped actuator of a second embodiment of the present invention. An actuator 30 of the second embodiment also includes a linear guide unit 34 that guides linear movement of a table 31 as a movable body, and a ball screw unit 37 that drives the table 31 as the movable body in an axial direction of a screw shaft 36.

In the actuator of the second embodiment, the linear guide unit 34 incudes a pair of left and right linear guides 34a and 34b. Each of the linear guides 34a and 34b includes a track rail 32, and a moving block 33 that is assembled to the track rail 32 via a plurality of rolling elements in such a manner as to be movable in a length direction. The track rail 32 is attached to a base 38. The moving block 33 is attached to the table 31.

The ball screw unit 37 includes the screw shaft 36 and a nut 35 that is threadedly engaged with the screw shaft 36 via a plurality of balls. The nut 35 is attached to the table 31 as the movable body. One end portion in the axial direction of the screw shaft 36 is rotatably supported by a housing 41 fixed to a top surface of the base 38. The other end portion in the axil direction of the screw shaft 36 is rotatably supported by an end portion wall 39 fixed to the top surface of the base 38.

The screw shaft 36 is rotated and driven by a motor 42. The motor 42 is attached to the housing 41. The screw shaft 36 and the motor 42 are coupled by a coupling 43. The coupling 43 is housed in the housing 41.

The housing 41 includes a bottom portion 41c, a first wall portion 41a provided with a bearing 45, a second wall portion 41b to which the motor 42 is attached, and a third wall portion 41d and a fourth wall portion 41e that face each other and are orthogonal to the first wall portion 41a and the second wall portion 41b.

A sensor 18 for detecting a fault in the actuator 30 is placed on a top surface of the bottom portion 41c of the housing 41. The configurations of the sensor 18 and a signal processing unit 20 are the same as the first embodiment. Accordingly, the same reference signs are assigned and their description is omitted.

The present invention is not limited to concretization into the embodiments, and can be concretized in various embodiments within a scope that does not change the gist of the present invention.

For example, in the embodiments, the signal processing unit calculates rms intensity, and determines whether or not a fault has occurred in the linear guide unit and/or the ball screw unit. However, it is also possible to cause the signal processing unit to perform processing up to the calculation of rms intensity and cause a high signal processing unit to make the determination.

The description is based on Japanese Patent Application No. 2016-176926 filed on Sep. 9, 2016, the entire contents of which are incorporated herein.

REFERENCE SIGNS LIST

1 Block (movable body)
2 Moving block
3 Track rail
4 Linear guide unit
5 Nut
6 Screw shaft
7 Ball screw unit
10 Actuator 11 Housing
11a First wall portion
11b Second wall portion
11c Bottom portion
12 Coupling
13 Motor
15 Bearing
18 Sensor
20 Signal processing unit
21 Amplifier
22 Filter
23 rms computing unit
24 FFT analysis unit
30 Actuator
31 Table (movable body)
32 Track rail
33 Moving block
34 Linear guide unit
35 Nut
36 Screw shaft
37 Ball screw unit
41 Housing
41a First wall portion
41b Second wall portion
41c Bottom portion
42 Motor
43 Coupling
45 Bearing

The invention claimed is:

1. A fault detection sensor-equipped actuator including a linear guide unit that guides linear movement of a movable body, and a ball screw unit that drives the movable body in an axial direction of a screw shaft, the actuator comprising:
a sensor configured to detect a fault in the actuator, inside a housing where a coupling that is directly coupled on the screw shaft and a motor shaft of a motor for rotating the screw shaft is housed,
wherein
boundaries of the housing are outlined by frame-shaped wall portions and a bottom portion to which the frame-shaped wall portions are fixed, the frame-shaped wall portions including a first wall portion provided with a bearing configured to rotatably support one end portion in an axial direction of the screw shaft closer to the motor than the other end portion in the axial direction of the screw shaft is, a second wall portion to which a main body of the motor is directly attached by a fastening member, a third wall portion and a fourth wall portion that face each other and are directly connected to the first wall portion and the second wall portion,
the sensor is placed on a top surface of the bottom portion of the housing and under the coupling, and
the sensor includes a vibration sensor that detects vibration of the housing, an AE (Acoustic Emission) sensor that detects an elastic wave propagating to the housing, or an ultrasonic sensor that detects ultrasound propagating to the housing.

2. A method for detecting a fault in an actuator including a linear guide unit that guides linear movement of a movable body, and a ball screw unit that drives the movable body in an axial direction of a screw shaft, the method comprising:
placing a sensor configured to detect a fault in the actuator, inside a housing where a coupling that is directly coupled on the screw shaft and a motor shaft of a motor for rotating the screw shaft is housed, wherein
boundaries of the housing are outlined by frame-shaped wall portions and a bottom portion to which the frame-shaped wall portions are fixed, the frame-shaped wall portions including a first wall portion provided with a bearing configured to rotatably support one end portion in an axial direction of the screw shaft closer to the motor than the other end portion in the axial direction of the screw shaft is, a second wall portion to which a main body of the motor is directly attached by a fastening member, a third wall portion and a fourth wall portion that face each other and are directly connected to the first wall portion and the second wall portion,
the sensor is placed on a top surface of the bottom portion of the housing and under the coupling, and
the sensor includes a vibration sensor that detects vibration of the housing, an AE (Acoustic Emission) sensor that detects an elastic wave propagating to the housing, or an ultrasonic sensor that detects ultrasound propagating to the housing.

\* \* \* \* \*